United States Patent
Furukawa et al.

(10) Patent No.: US 8,797,693 B1
(45) Date of Patent: Aug. 5, 2014

(54) IMPLEMENTING ENHANCED ESD PREVENTION FOR HARD DISK DRIVES USING SPIN-TORQUE OSCILLATOR (STO)

(71) Applicant: HGST Netherlands B.V., Amsterdam (NL)

(72) Inventors: Masaru Furukawa, Fujisawa (JP); Junguo Xu, Kasumigaura (JP); Makoto Satou, Hiratsuka (JP); Kenji Suzuki, Fujisawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/975,660

(22) Filed: Aug. 26, 2013

(51) Int. Cl.
*G11B 5/33* (2006.01)
(52) U.S. Cl.
USPC .......................................................... 360/323
(58) Field of Classification Search
USPC ...................... 360/59, 128, 323, 110, 125.16
See application file for complete search history.

(56) References Cited

U.S. PATENT DOCUMENTS

| | | | |
|---|---|---|---|
| 7,355,821 | B2 | 4/2008 | Suda |
| 7,852,591 | B1 * | 12/2010 | Sutardja ........................ 360/67 |
| 8,085,490 | B2 | 12/2011 | Franca-Neto et al. |
| 8,159,790 | B2 | 4/2012 | Tan et al. |
| 8,169,751 | B2 | 5/2012 | Albrecht et al. |
| 2003/0218813 | A1 | 11/2003 | Dakroub |
| 2007/0217053 | A1 | 9/2007 | Sugimoto |
| 2011/0211271 | A1 | 9/2011 | Ng et al. |

OTHER PUBLICATIONS

"Surface Finish and Performances of Read/Write Heads by Using Ultra-Fine Diamond Slurry in Polishing Process" by Jian-Bin Luo et al., International Journal of Nonlinear Sciences and Numberical Simulation 3, 449-454, 2002.

* cited by examiner

*Primary Examiner* — Nabil Hindi
(74) *Attorney, Agent, or Firm* — Joan Pennington

(57) ABSTRACT

A method, apparatus, and system are provided for preventing electrostatic discharge (ESD) in hard disk drives using spin-torque oscillator (STO) for microwave assisted magnetic recording (MAMR). A control circuit adjusts a disk electrical potential with an electrical potential of a spin-torque oscillator (STO) element. The control circuit maintains a potential difference of less than about 115 millivolts (mV) between the disk and the STO element.

20 Claims, 6 Drawing Sheets

IMPLEMENTING ENHANCED ESD PREVENTION FOR HARD DISK DRIVES USING SPIN-TORQUE OSCILLATOR (STO)

FIELD OF THE INVENTION

The present invention relates generally to the data storage field, and more particularly, relates to a method, apparatus, and system for implementing enhanced electrostatic discharge (ESD) prevention for hard disk drives using spin-torque oscillator (STO) for microwave assisted magnetic recording (MAMR).

DESCRIPTION OF THE RELATED ART

In hard disk drives (HDDs) or a disk-drive system, read and write transducers reside in a slider which flies over a recording media or disk surface. The fly-height of the slider-to-disk has become smaller as storage densities continue to increase and fly-heights decrease. In recent years, in order to increase the recording density of an HDD, the technique has been developed of performing magnetic recording using a spin torque oscillator (STO) element incorporated in the slider.

With current HDDs, the gap between the slider and the disk is a few nanometers (nm). With such a minute gap, the disk and the STO element incorporated in the slider can easily come into contact. If the STO element and the disk do come into contact, the protective film layer of the disk surface and the STO element are abraded by friction, causing contact of the conductive portions of the STO element and the disk to occur. If contact occurs, current flows due to the potential difference between the STO element and the disk, resulting in the problem of destruction of the STO. This lowers the reliability of HDDs using STO elements. Some way of preventing such flow of current between the STO element and the disk is therefore necessary.

For example, a method of applying a fixed voltage to the disk has been disclosed as a method of controlling the potential difference between the HDD slider and the disk. However, during writing operation of the HDD, writing of data and reading of the servo signal are performed alternately, so the voltage applied to the STO element is alternately turned ON and OFF repeatedly. Consequently, a voltage difference is produced between the STO element and the disk surface, which can result in flow of current between disk and the STO element, making destruction of the STO element more likely.

A need exists for effective mechanism to prevent electrostatic discharge (ESD) for spin-torque oscillator for microwave assisted magnetic recording (MAMR).

SUMMARY OF THE INVENTION

Aspects of the preferred embodiments are to provide a method, apparatus, and system for preventing electrostatic discharge (ESD) for hard disk drives using spin-torque oscillator (STO). Other important aspects of the preferred embodiments are to provide such method, apparatus, and system substantially without negative effect and to overcome some of the disadvantages of prior art arrangements.

In brief, a method, apparatus, and system are provided for preventing electrostatic discharge (ESD) for hard disk drives using spin-torque oscillator (STO). A control circuit adjusts a disk electrical potential to change with an electrical potential of a spin-torque oscillator (STO) element. The control circuit maintains a potential difference of less than about 115 millivolts (mV) between the disk and the STO element.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the embodiments of the invention, a method, apparatus, and system are provided for preventing electrostatic discharge (ESD) for hard disk drives (HDDs) using spin-torque oscillator (STO) for microwave assisted magnetic recording (MAMR). A control circuit of the embodiments effectively controls a potential difference between the disk and a spin-torque oscillator (STO) element to prevent electrostatic discharge (ESD) damage to the STO element and disk.

Figure 1:
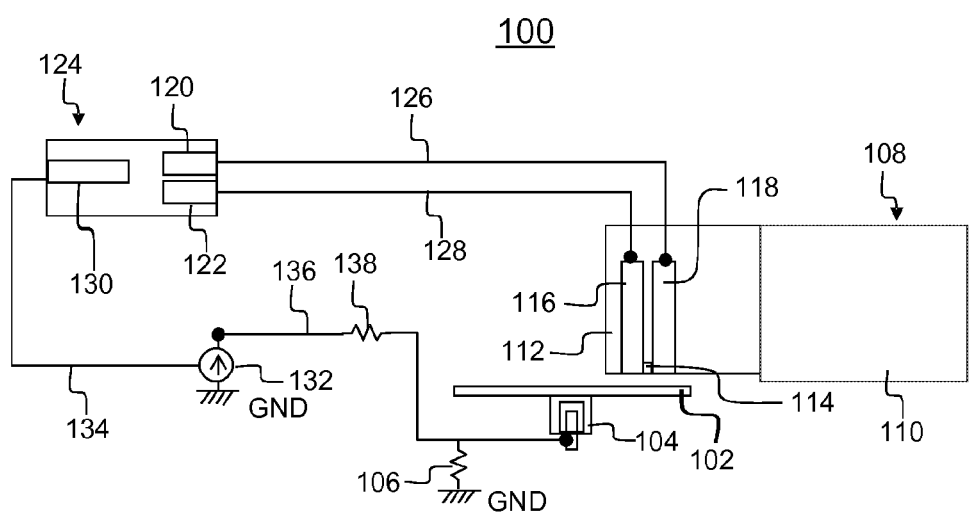
FIG. 1 is a schematic and block diagram representation illustrating an example system for preventing electrostatic discharge (ESD) for hard disk drives using spin-torque oscillator (STO) and a control circuit in accordance with a preferred embodiment.

Having reference now to the drawings, in FIG. 1, there is shown an example system generally designated by the reference character 100 for preventing electrostatic discharge (ESD) for hard disk drives using spin-torque oscillator (STO) in accordance with a preferred embodiment. System 100 is a hard disk drive (HDD) including a recording media or a disk 102 for storing data. The disk 102 is fixed to a disk spindle 104. The disk spindle 104 is earthed to a ground potential GND of a frame (not shown) of the HDD through a resistance 106.

A slider 108 is levitated facing the rotating disk 102. A thin film section 112 is formed on the slider 108 at the end of a slider main body 110; and an STO element 114, an STO electrode 116 and an STO electrode 118 are formed on the thin film section 112. The STO electrode 116 and STO electrode 118 are connected to a pair of terminals 120, 122 of a preamplifier (preamp) 124, through a pair of wirings 126 and 128. A terminal 130 of the preamp 122 is connected with a potential control circuit 132 through a wiring 134. The potential control circuit 132 is connected with the disk spindle 104 through a wiring 136 and a current-limiting resistor 138.

In the system 100 of the present embodiment, since a potential difference is produced between the terminal 120 and the terminal 122 of the preamp 124, the potential of the STO electrode 116 or STO electrode 118 becomes higher prior to conduction, and conduction occurs at the STO element 114. It should be noted that conduction could be in either a voltage-application configuration or in a current-application configuration.

Concurrently, on conduction, a signal is delivered from the terminal 130 to the potential control circuit 132. The potential control circuit 132 alters the potential of the disk spindle 104 through the wiring 136 in response to this signal from the terminal 130. Since the disk spindle 104 and the disk 102 are electrically conductive, the potential of the disk 102 also changes. Also, the disk spindle 104 constitutes a mechanism that includes a motor, so, in order to suppress noise caused by the motor, it is preferably constructed with the disk spindle 104 earthed by the resistance 106.

Figure 2:
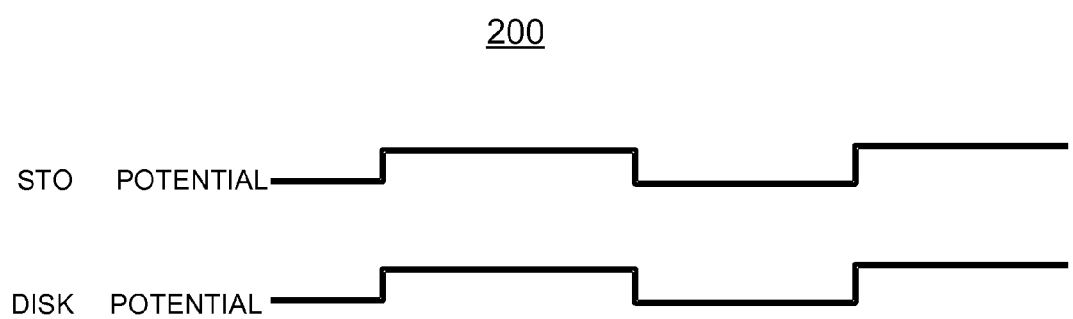
FIG. 2 is a chart illustrating an example relationship between a spin torque oscillator (STO) element and a disk potential for hard disk drives (HDDs) in accordance with a preferred embodiment.

Referring to FIG. 2, there is shown an example relationship between a potential of a STO and a disk potential of disk, such as and a potential of the spin torque oscillator (STO) element 114, the STO electrode 116, or STO electrode 118 and a disk potential of the disk 102 generally designated by the reference character 200 for hard disk drives (HDDs) in accordance with a preferred embodiment. As shown, the STO potential is the potential of the STO element 114, STO electrode 116, or STO electrode 118, whose potential difference with respect to the potential of the GND level is largest. On conduction, the STO potential and the disk potential rise; when non-conducting, the STO potential and disk potential fall. In this way, the potential difference between the STO potential and disk potential becomes small on conduction, making it more difficult for current to flow between the STO element 114 and the disk 102; in this way, the possibility of destruction of the STO element 114 is eliminated.

Figure 3:
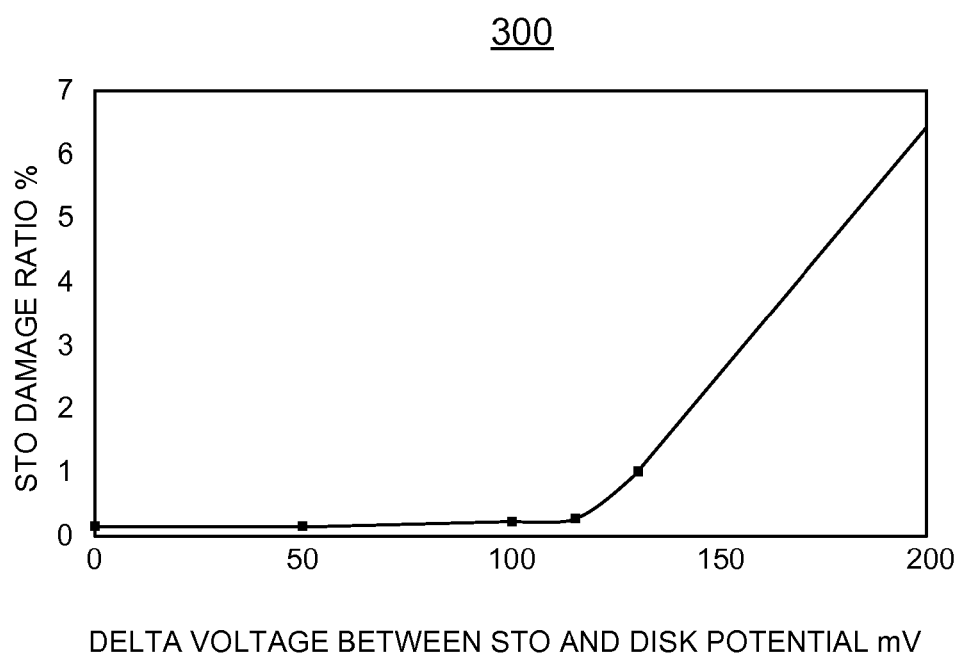
FIG. 3 is a chart illustrating an example relationship between a Delta voltage between STO and disk potential and an STO damage ratio for hard disk drives (HDDs) in accordance with a preferred embodiment.

Referring to FIG. 3, there is shown an example relationship between a delta voltage between STO and disk potential and an STO damage ratio generally designated by the reference character 300 for hard disk drives (HDDs) in accordance with a preferred embodiment. As shown, the relationship between the frequency of destruction of the STO element 114 and the potential difference remains at approximately zero until the potential difference between the STO element 114 and the disk 102 is greater than 115 mV. Most preferably, the potential difference is zero, but it is fully satisfactory if the potential difference is less than 115 mV, since this is the level at which destruction of the STO element 114 is suppressed.

Next, the appropriate magnitude of the potential of the disk 102 is described as follows. If during conduction the STO electrode 116 or STO electrode 118 assumes the operating voltage V_STO of the STO element 114 and the STO electrode 116 or STO electrode 118 is GND-level potential, the appropriate potential of the disk 102 is V_STO on conduction, or, when non-conducting, the GND-level potential. At this point, the STO electrode 118 or STO electrode 116 is GND-level potential, so the possibility of current flow from the disk 102 to the electrode 118 or STO electrode 116 must be considered. In order to prevent this, current flow to the disk 102 from the potential control circuit 132 is suppressed by the current-limiting resistor 138. The current-limiting resistor 138 is suitably at least 10 kilohms (kΩ).

During conduction, if the STO electrode 116 or STO electrode 118 has a potential of V_STO_1 and the STO electrode 118 or STO electrode 116 has a potential of V_STO_2, a suitable potential of the disk 102 during conduction is the potential equals (V_STO_1+V_STO_2)/2. Preferably also when non-conducting, the disk 102 has the average potential of the non-conducting potentials of the STO electrode 116 and STO electrode 118.

As described above, preferably control is performed so that the potential difference of the STO potential and disk potential when conducting and when non-conducting is close to zero.

Also, if a potential difference is generated, the distance between the STO element 114 and the disk 102 contracts, because of the Coulomb force. In general, when writing data to the HDD during conduction, the recording element section of the slider 108 projects towards the disk 102 due to generation of heat, but when reading, no longer projects in this manner. Therefore, during conduction, the potential difference is made smaller, so flow of current between the STO element 114 and disk 102 is suppressed. Whereas, during non-conduction, the potential difference is made larger, so the gap between the slider 108 and the disk 102, which is increased because the projection of the recording element section is eliminated, is reduced. Which is ideal.

Figure 4:
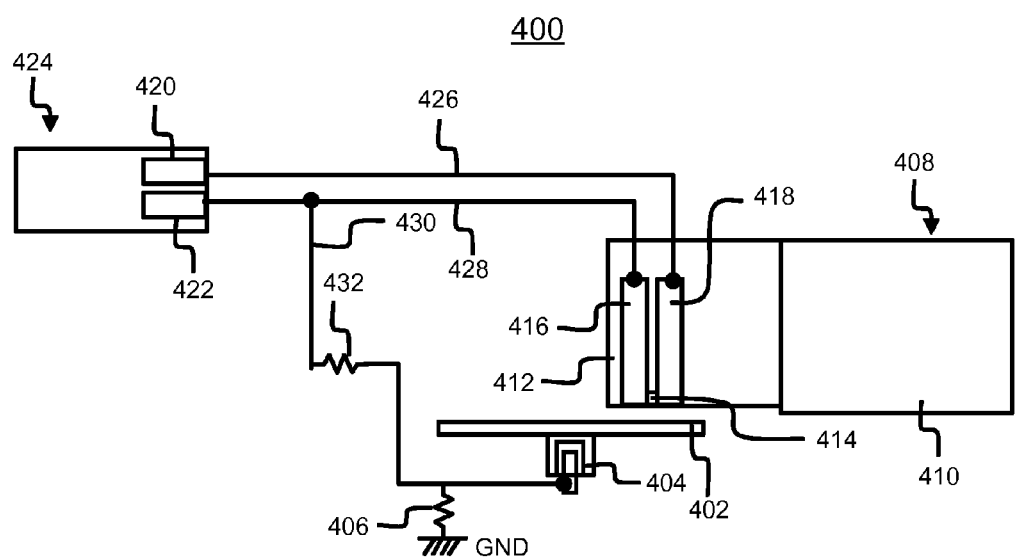
FIG. 4 is a schematic and block diagram representation illustrating another system for preventing electrostatic discharge (ESD) for hard disk drives using spin-torque oscillator (STO) and a control circuit in accordance with a preferred embodiment.

Referring to FIG. 4, there is shown another system generally designated by the reference character 400 for preventing electrostatic discharge (ESD) for hard disk drives using spin-torque oscillator (STO) and a disk potential control circuit in accordance with a preferred embodiment. System 400 is a hard disk drive (HDD) including a recording media or a disk 402 for storing data. The disk 402 is fixed to a disk spindle 404. The disk spindle 404 is earthed to a ground potential GND of a frame (not shown) of the HDD through a resistance 406.

A slider 408 is levitated facing the rotating disk 402. A thin film section 412 is formed on the slider 408 at the end of a slider main body 410; an STO element 414, an STO electrode 416 and an STO electrode 418 are formed on the thin film section 412. The STO electrode 416 and STO electrode 418 are connected to a pair of terminals 420, 422 of a preamplifier (preamp) 424, through a pair of wirings 426 and 428. The terminal 422 of the preamp 424, connected to the wiring 428, is connected with the disk spindle 404 through a wiring 430 and a current-limiting resistor 432.

In the system 400 of the present embodiment, since a potential difference is produced between the terminal 420 and the terminal 422 of the preamp 424, the potential of the STO electrode 416 or STO electrode 418 becomes higher prior to conduction, and conduction occurs at the STO element 414. It should be noted that conduction could be in either a voltage-application configuration or in a current-application configuration.

Also, the potential of the disk 402 is elevated, through the wiring 430. In this way, in the system 400 of the present embodiment, the potential of the disk 402 changes automatically in a manner synchronized with conduction and non-conduction of the STO element 414. Also, a construction would be adopted in which, on conduction, when the potential of the STO electrode 418 is high, the wiring 430 would be branched from the wiring 426.

Also, in the system 400 of the present embodiment, a construction is adopted in which the wiring 430 is connected with the disk spindle 404 and the potential of the disk 402 is changed by the electrical circuitry of the preamp 424. Suitably, the potential of the disk 402 in this case is the same as in the case of the first embodiment in the system 100 of FIG. 1.

The appropriate magnitude of the potential of the disk 402 and the appropriate potential difference of the STO element 414 and the disk 402 are the same as in the case of the first embodiment in the system 100 of FIG. 1.

Figure 5:
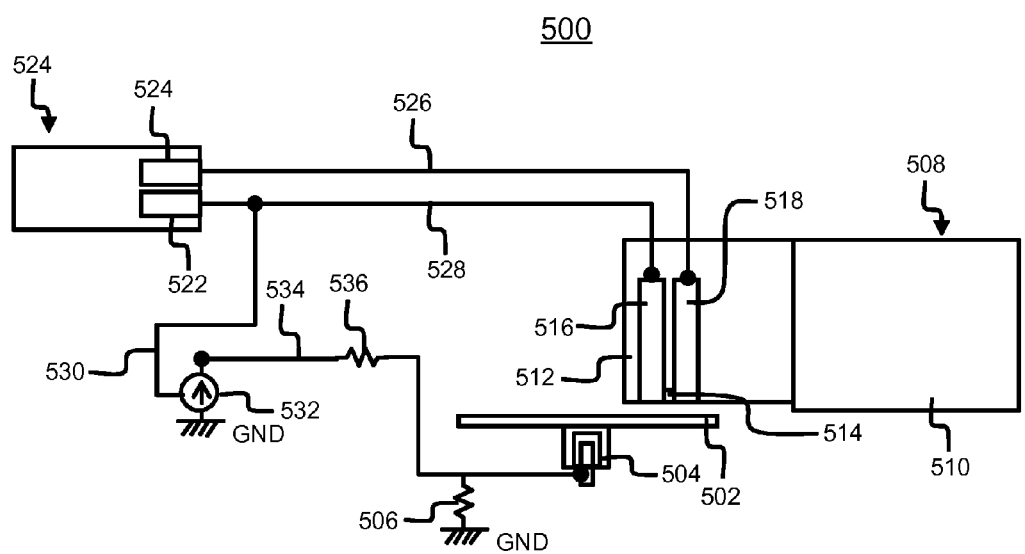
FIG. 5 is a schematic and block diagram representation illustrating another system for preventing electrostatic discharge (ESD) for hard disk drives using spin-torque oscillator (STO) and a control circuit in accordance with a preferred embodiment.

Referring to FIG. 5, there is shown another system generally designated by the reference character 500 for preventing electrostatic discharge (ESD) for hard disk drives using spin-torque oscillator (STO) and a disk potential control circuit in accordance with a preferred embodiment. System 500 is a hard disk drive (HDD) including a recording media or a disk 502 for storing data. The disk 502 is fixed to a disk spindle 504. The disk spindle 504 is earthed to a ground potential GND of a frame (not shown) of the HDD through a resistance 506.

A slider 508 is levitated facing the rotating disk 502. A thin film section 512 is formed on the slider 508 at the end of a slider main body 510; an STO element 514, an STO electrode 516 and an STO electrode 518 are formed on the thin film section 512. The STO electrode 516 and STO electrode 518 are connected to a pair of terminals 520, 522 of a preamplifier (preamp) 524, through a pair of wirings 526 and 528. The terminal 522 of the preamp 524, connected to the wiring 528, is connected with a wiring 530 to a potential control circuit 532. The potential control circuit 532 is connected with the disk spindle 504 through a wiring 534 and a current-limiting resistor 536.

Although, in the embodiments of system 100, 400, and 500 of FIGS. 1, 4, and 5 described above, a construction is adopted in which a signal is extracted from the preamp 124, 424, and 524 and used to change the disk potential, there is no restriction to a signal from the preamp, and a construction could equally be adopted in which a signal is emitted to the preamp and potential control circuit from peripheral circuitry of the preamp.

Figure 6:
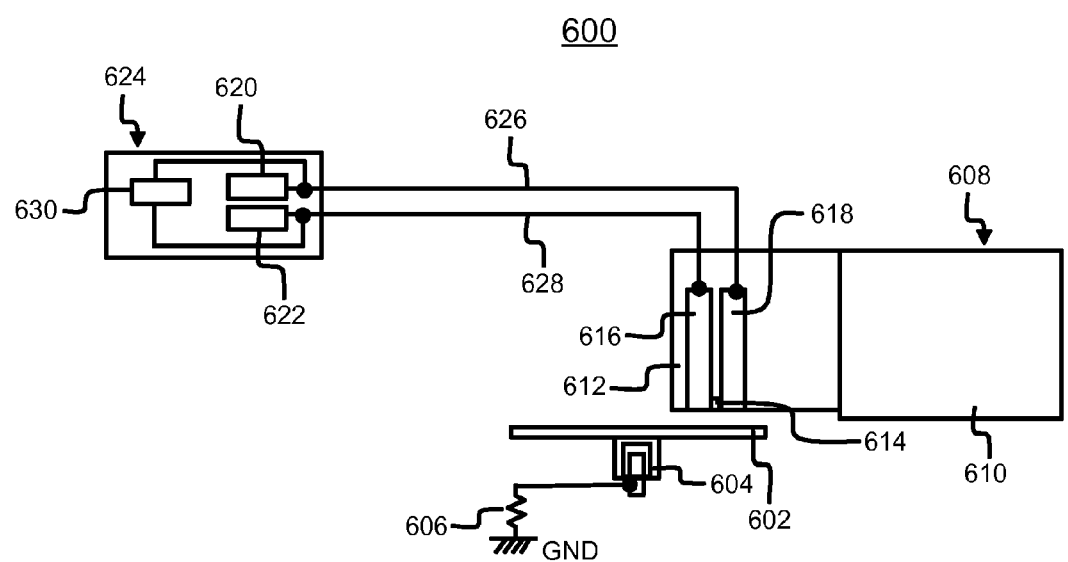
FIG. 6 is a schematic and block diagram representation illustrating another system for preventing electrostatic discharge (ESD) for hard disk drives using spin-torque oscillator (STO) and a control circuit in accordance with a preferred embodiment.

Referring to FIG. 6, there is shown another system generally designated by the reference character 600 for preventing electrostatic discharge (ESD) for hard disk drives using spin-torque oscillator (STO) and a disk potential control circuit in accordance with a preferred embodiment. System 600 is a hard disk drive (HDD) including a recording media or a disk 602 for storing data. The disk 602 is fixed to a disk spindle 604. The disk spindle 604 is earthed to a ground potential GND of a frame (not shown) of the HDD through a resistance 606.

A slider 608 is levitated facing the rotating disk 602. A thin film section 612 is formed on the slider 608 at the end of a slider main body 610; an STO element 614, an STO electrode 616 and an STO electrode 618 are formed on the thin film section 612. The STO electrode 616 and STO electrode 618 are connected to a pair of terminals 620, 622 of a preamplifier (preamp) 624, through a pair of wirings 626 and 628. A common voltage circuit 630 provided with the preamp 624 is connected to the terminal 620 of the preamp 624 and to the wiring 626, and is connected to the terminal 622 of the preamp 624 and to the wiring 628, respectively connected to the STO electrode 618 and STO electrode 616.

When, on conduction to the STO element 614 coupled between the STO electrode 618 and STO electrode 616, a fixed common mode voltage is supplied to the wirings 626 and 628 by the common voltage circuit 630, and the common mode voltage is applied to the STO electrode 616 and the STO electrode 618, with the result that the potential of the STO element 614 also changes. By applying common mode voltage such that the potential difference between the STO element 614 and the disk 602 becomes small, the potential difference between the STO element 614 and the disk 602 during conduction becomes small, with the result that any possibility of destruction of the STO element 614 due to passage of current between the STO element 614 and the disk 602 is eliminated. In this case, the potential difference between the STO element 614 and the disk 602 is suitably less than 115 mV.

In the embodiment of system 600 of FIG. 6 also, it is desirable that the potential difference of the STO potential and the disk potential should be controlled to be close to zero during conduction and during non-conduction. Also, if a potential difference is generated, the distance between the STO element 614 and the disk 602 contracts, because of the Coulomb force. Therefore, during conduction, the potential difference is made smaller, so flow of current of the STO element 614 and the disk 602 is suppressed. Whereas, during non-conduction, the potential difference is made larger, so the gap between the slider 608 and the disk 602, which is increased because the projection of the recording element section is eliminated, is reduced. Which is ideal.

In the embodiment of system 600, while there is no dynamic control of the potential of the disk 602; the disk 602 is earthed by means of the resistance 606.

While the present invention has been described with reference to the details of the embodiments of the invention shown in the drawing, these details are not intended to limit the scope of the invention as claimed in the appended claims.

What is claimed is:

1. A method for preventing electrostatic discharge (ESD) in hard disk drives using spin-torque oscillator (STO) comprising:
providing control circuitry for adjusting a disk electrical potential with an electrical potential of a spin-torque oscillator (STO) element; and
said control circuitry maintaining a potential difference of less than about 115 millivolts (mV) between a disk and the STO element.

2. The method as recited in claim 1 includes providing said spin-torque oscillator (STO) element coupled between a first STO electrode and a second STO electrode, and a preamplifier coupled to said first STO electrode and said second STO electrode.

3. The method as recited in claim 1 wherein providing control circuitry for adjusting a disk electrical potential with an electrical potential of a spin-torque oscillator (STO) element includes providing a preamplifier including an STO reference terminal, and said STO reference connected to a potential control circuit, and providing said potential control circuit coupled to a disk spindle supporting the disk.

4. The method as recited in claim 3 wherein providing said potential control circuit coupled to said disk spindle supporting the disk includes providing a wire connecting said STO reference terminal and said potential control circuit.

5. The method as recited in claim 3 includes providing a current-limiting resistance between said potential control circuit and said disk spindle, said current-limiting resistance of at least 10 kilohms (kΩ).

6. The method as recited in claim 1 wherein providing circuitry for adjusting a disk electrical potential with an electrical potential of a spin-torque oscillator (STO) element includes providing said spin-torque oscillator (STO) element coupled between a first STO electrode and a second STO electrode and providing a preamplifier having respective terminals coupled to said first STO electrode and said second STO electrode, and providing one of said respective terminals of said preamplifier coupled to a disk spindle supporting the disk.

7. The method as recited in claim 6 wherein providing one of said respective terminals of said preamplifier coupled to a disk spindle supporting the disk includes providing a current-limiting resistance between said one of said respective terminals of said preamplifier and said disk spindle.

8. The method as recited in claim 1 wherein providing circuitry for adjusting a disk electrical potential with an electrical potential of a spin-torque oscillator (STO) element includes providing said spin-torque oscillator (STO) element coupled between a first STO electrode and a second STO electrode and providing a preamplifier having respective terminals coupled to said first STO electrode and said second STO electrode, providing a potential control circuit coupled to a disk spindle supporting the disk, and providing one of said respective terminals of said preamplifier coupled to said potential control circuit.

9. The method as recited in claim 1 wherein providing a potential control circuit coupled to a disk spindle supporting the disk includes providing a current-limiting resistance between said potential control circuit and said disk spindle, said current-limiting resistance of at least 10 kilohms (kΩ).

10. The method as recited in claim 1 wherein providing circuitry for adjusting a disk electrical potential with an electrical potential of a spin-torque oscillator (STO) element includes providing said spin-torque oscillator (STO) element coupled between a first STO electrode and a second STO electrode and providing a preamplifier having respective terminals coupled to said first STO electrode and said second STO electrode, providing a common voltage circuit applying a common mode voltage to said respective terminals of said preamplifier responsive to conduction by said STO element.

11. An apparatus for preventing electrostatic discharge (ESD) in hard disk drives using spin-torque oscillator (STO) comprising:
   control circuitry for adjusting a disk electrical potential with an electrical potential of a spin-torque oscillator (STO) element; and
   said control circuitry maintaining a potential difference of less than about 115 millivolts (mV) between the disk and the STO element.

12. The apparatus as recited in claim 11 wherein said control circuitry includes said spin-torque oscillator (STO) element coupled between a first STO electrode and a second STO electrode, and said control circuitry includes a preamplifier having respective terminals coupled to said first STO electrode and said second STO electrode.

13. The apparatus as recited in claim 12 wherein said control circuitry includes said preamplifier including an STO reference terminal, and said STO reference connected to a potential control circuit, said potential control circuit coupled to a disk spindle supporting the disk, and a current-limiting resistance coupled between said potential control circuit and said disk spindle.

14. The apparatus as recited in claim 12 wherein said control circuitry includes one of said respective terminals of said preamplifier coupled to a disk spindle supporting the disk, and a current-limiting resistance coupled between said one of said respective terminals of said preamplifier and said disk spindle.

15. The apparatus as recited in claim 12 wherein said control circuitry includes one of said respective terminals of said preamplifier coupled to a potential control circuit, said potential control circuit coupled to a disk spindle supporting the disk, and a current-limiting resistance coupled between said potential control circuit and said disk spindle.

16. The apparatus as recited in claim 12 wherein said control circuitry includes a common voltage circuit applying a common mode voltage to said respective terminals of said preamplifier responsive to conduction by said STO element.

17. A system for preventing electrostatic discharge (ESD) in hard disk drives using spin-torque oscillator (STO) comprising:
   at least one disk for storing data;
   a slider including a spin-torque oscillator (STO) element; said spin-torque oscillator (STO) element coupled between a first STO electrode and a second STO electrode;
   control circuitry for adjusting a disk electrical potential with an electrical potential of a spin-torque oscillator (STO) element; and
   said control circuitry maintaining a potential difference of less than about 115 millivolts (mV) between the disk and the STO element.

18. The system as recited in claim 17 wherein said control circuitry includes a preamplifier having respective terminals coupled to said first STO electrode and said second STO electrode.

19. The system as recited in claim 18 wherein said preamplifier includes an STO reference terminal, and said STO reference connected to a potential control circuit, said potential control circuit coupled to a disk spindle supporting the disk, and a current-limiting resistance coupled between said potential control circuit and said disk spindle.

20. The system as recited in claim 18 wherein said control circuitry includes one of said respective terminals of said preamplifier coupled to a disk spindle supporting the disk, and a current-limiting resistance coupled between said one of said respective terminals of said preamplifier and said disk spindle.

* * * * *